UNITED STATES PATENT OFFICE.

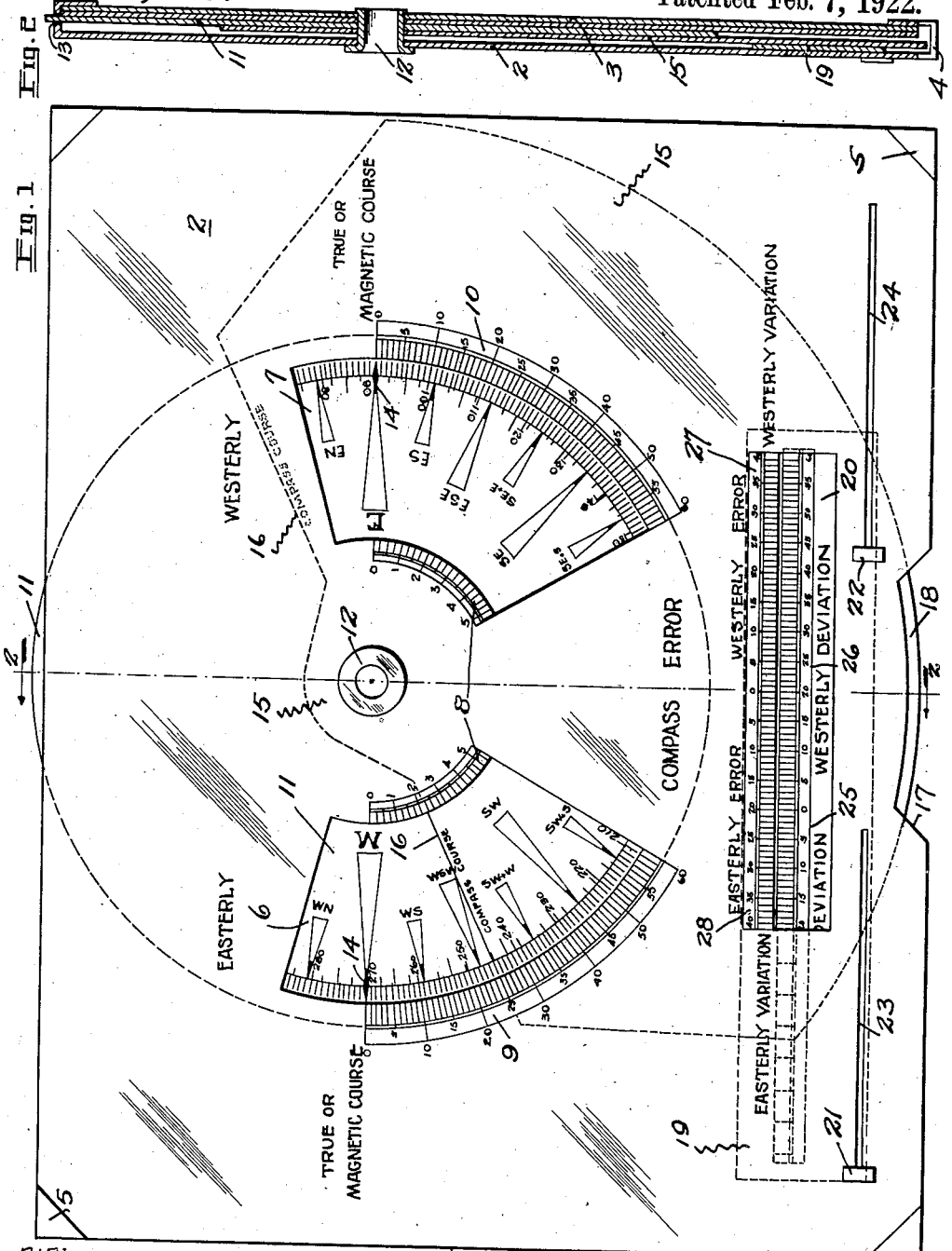

FRED M. KRAMER, OF SAN FRANCISCO, CALIFORNIA.

COURSE CORRECTOR.

1,405,598.  Specification of Letters Patent.  Patented Feb. 7, 1922.

Application filed August 12, 1919. Serial No. 316,988.

*To all whom it may concern:*

Be it known that I, FRED M. KRAMER, a citizen of the United States, and a resident of the city and county of San Francisco and State of California, have invented a new and useful Course Corrector, of which the following is a specification.

My invention relates to a device for aiding in the navigation of a ship by providing for a rapid and accurate calculation of the compass error and the correction of a given course.

An object of the invention is to provide a device of the character described which will indicate, that is, will make visible by mechanical means the relative directions of the course to be made good and the course to be steered in order to allow for the compass error and make good the desired or given course, thus eliminating all uncertainty as to the correct manner of applying the compass error and avoiding mistakes in steering.

Another object is to provide a course corrector of the character described which is relatively small, simple as to construction, inexpensive and capable of being so placed with relation to the compass that the navigator may be guided by the indications made visible by the corrector and act accordingly without liability of error in the application of the correction to the compass.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a top plan view of my invention.

Figure 2 is a vertical sectional view taken on line 2—2 of Figure 1.

In carrying out my invention I preferably employ a flat envelope or casing of some light non-magnetic material and within the envelope I rotatably mount a compass card and an indicating disk or dial, the latter over the former. Both of these elements have a common pivot and each extends out of the casing or envelope so that it may be turned by the fingers of the user. One edge of the dial is straight and acts as a pointer or indicator with relation to the compass card so that by reading the card directly in line with said edge the direction of the course to be steered may be determined.

A strip bearing a deviation scale is slidably mounted within the envelope and provided with means for effecting the reciprocation of the slide from the exterior of the envelope. The envelope is preferably opaque but is provided with segmental transparent portions arranged arcuately and concentric with the axis of the card so that the calibrations on the card may be read. Compass error scales are printed along the outer edges of these portions and these scales are calibrated in degrees. On the inner edges of the transparent portions are provided error scales calibrated in "points." The envelope is provided with another transparent portion over the deviation scale and along one edge of this portion a combined compass error and variation scale is provided.

Knowing the deviation and variation, the total or compass error may be readily determined by proper manipulation of the scale strip with relation to the eror scale with which it cooperates and the error will appear on the error scale. By properly manipulating the compass and card and disk or dial with relation to the scales, the course to be steered will be indicated by the dial and the course which is to be made good is also shown by a black line extending across the transparent portions over the center of the compass card. The reading of the card under the line is the direction of the course to be made good. Thus I may correct the compass course to a magnetic or true course or I may correct the true or magnetic course to determine the compass course, all so that the error or correction may be visualized and the relative directions of the course shown so that mistakes in application of the error may be avoided.

My invention comprises preferably a non-magnetic body or casing 1 in the form of an envelope which consists of an upper, preferably opaque, sheet 2 and a bottom sheet 3. The upper sheet is folded at its edges as at 4 so as to overlap the edges of the sheet 3 and suitable fastening elements 5 are inserted through the overlapped portions to hold the sheets together.

There are provided segmental transparent portions 6 and 7 arranged opposite to one another and arcuately on the sheet 2. Scales 8 are provided along the inner curved edges of the portions 6 and 7 and are calibrated in points numbered from 0 to 5 or more. Along the outer curved edges of the portions 6 and 7 are provided compass error and deviation scales 9 and 10 both calibrated in degrees and concentric with the scales 8. The scale 9 is for easterly compass errors or deviation, the scale 10 for westerly compass errors or deviation and the scales may be thus designated as shown in the drawings.

An ordinary compass card 11 is rotatably mounted on a pin 12 within the envelope, the pin being disposed between the segmental transparent portions 6 and 7 and inserted through the sheets 2 and 3 of the envelope. This card is so arranged with relation to the portions 6 and 7 that substantially half of the card is visible, that is, two opposite quadrants of the card are preferably shown and the axis of the card is concentric with the curved inner and outer edges of the scales 8, 9 and 10 so that the calibrations on the card may be brought to alinement with the scale calibrations. The card extends past the upper edge of the envelope through a slot 13 therein so that it may be turned as desired.

A line 14, preferably black, is drawn across each segmental transparent portion and extends across and over the center of the card radial thereto so that any calibration on the card may be brought to register with the line. This line may be termed the true or magnetic course indicating line.

An indicating member 15 of transparent material is mounted for rotation on the pin 12 over the compass and is substantially semi-circular, the straight or indicating and pointing edge 16 thereof intersecting and being radial to the axis of the card so that it may be brought to alinement with calibrations on the card and those of the scales 8, 9 and 10. This edge is the compass course indicating edge and is preferably so marked as shown in the drawings.

The lower edge of the envelope is slotted and cut away as at 17 and the curved edge 18 of the member 15 extends through the slot into the cut away portion so as to provide for the turning of the member.

Mechanical calculating means is provided for computing the compass error and this means comprises a slide strip 19 movable back and forth within the envelope under a transparent portion 20 in the upper sheet 2 of said envelope. Operating buttons 21 and 22 are secured to the end portions of the strip and work in slots 23 and 24 formed in the sheet 2. These buttons provide for the moving of the strip back and forth. The strip bears a scale calibrated in degrees from 0° at the middle of the strip to 60° or more at each end, that is, the calibrations read up to 60° from each side of the 0° mark and the left side 25 is for easterly deviation whereas the right side 26 is for westerly deviation, each side being so marked.

Along the upper edge of the transparent portion 20 a combined variation and compass error scale is provided for cooperation with the scale on the strip 19. This scale is divided identically with the scale on the strip, the right side 27 thereof being for westerly errors and westerly variations, and the left side 28 thereof being for easterly compass errors and the sides are thus marked.

Assuming that a navigator wishes to make good a course due west, 270° angular measure and the deviation is known to be 5° east, the variation according to the chart being 20° east, the slide strip 19 is properly moved by the buttons 21 and 22 so as to bring the 0° mark under the 20° variation mark of the easterly variation, side 28 of the variation scale. The total error is then shown above the 5° mark on the variation scale and is found to be 25° east. If the compass showed a 5° westerly deviation the total error would be found to be 15° east.

Having thus quickly and accurately found the compass errors which is the algebraic sum of the deviation and variation errors, the compass card is next turned so as to bring the 270° or due west mark to lie directly under and in line with the true course line 14 preferably on the transparent portion 6. Next the member 15 is turned to bring the edge 16 thereof in line with the 25° mark on the easterly error scale 9 along the transparent portion 6 and the indicating edge 16 then points in the direction, with relation to the compass card, of the course to be steered and by reading the compass card designation opposite this edge the course to be steered may be readily determined. It will thus be seen that the relative directions of the true and compass courses are made visible by the line 14 and the edge 16 and serve as a guide to the navigator in steering the ship.

With the course to be made good, due west or 270°, deviation 5° E. variation 20° E. compass error 25° E. the course to be steered or compass course is found to be approximately 2¼ points south of W. or S. W. by W. ¾ W. or by angular measure 245 degrees. Now if the course to be made good is S. or 180° the compass card south mark is brought opposite to the true course line 14 on the transparent portion 7. The deviation is known to be 10° W. and the variation is found to be 4° E.

The deviation scale strip 19 is moved to bring the 0° mark thereon opposite to the 4° E. variation mark on the east side 28 of said variation scale. Then by consulting the 10° W. mark on the west side 26 of the deviation scale on the strip it is found opposite to the 6° mark on the west side 27 of the compass error and variation scale and the total compass error is the algebraic sum as shown, viz. 6° W. The member 15 is then turned to bring the edge 16 on the right side thereof in line with the 6° mark on the west compass error scale 10. By then reading the compass along this edge of the disk the course to be steered may be determined. In this case this course is found to be approximately ½ point west of south, or S. ½ W., or 186 degrees angular measure.

Summing up the foregoing, it may be said that the invention lies in the provision of means for compelling a correct application of the compass error to make good the desired course. The computation of the total compass error is a simple matter and mistakes do not happen with ordinary care. It is in the application of the error to make good the true course that mistakes occur; that is, an easterly correction is made for a westerly error and a westerly correction for an easterly error. My device compels a choice of visible, material elements, thus requiring a specific selection of the "easterly" or "westerly" side of the device for indicating the course. The easterly error is applicable on one side of the device and the westerly error on the other. They cannot be superposed or confused, and knowing the error, one cannot misapply it without ignoring the prominent indicia.

It will be seen that the present device embodies a compass card that is co-ordinate to duplex segments of degree arcs, having a center common with the center of the compass card; the degree segments consisting essentially of indicating means with respect to which there may be adjusted an index member having respective index portions for each of the indicia 9 and 10 so that one portion of the index member is utilized in making correction for easterly courses while the other is separately usable for westerly correction. Again by the present device the corrected course may be found by a minimum movement of the index member 15 inasmuch as it is provided with radially opposite index edges 16 and for the purpose of reducing or obviating error the device includes a cover member having windows through which are exposed adjacent portions of the compass card and through which windows only one or the other of the index portions of the index member 15 can be effectively presented inasmuch as the indicia arcs spring from a common base or zero line passing through the common center of the movable members. The window area of the cover 2 is such that as one of the index edges or portions 16 of the index member moves beyond a predetermined point in the setting of the device its index function is negated leaving only the opposite index edge as effective.

I claim:

1. A device of the character described, comprising a mounting having diametrically opposite segmental windows, a pivot at the center of the arcs, a compass card, rotative about the pivot and having its degree calibrations contiguous to the outer edges of the windows, east and west degree indicia extending from diametrically opposite zero points around the outer edges of the windows and co-ordinate with the compass degree scale, and a course index member interposed between the card and the mounting and having opposite indices to be set in selective relation to the respective indicia and show, on the compass card, the compass course.

2. A device of the character described, comprising a mounting having diametrically opposite segmental windows, a pivot at the center of the arcs, a compass card, rotative about the pivot and having its degree calibrations contiguous to the outer edges of the windows, east and west degree indicia extending from diametrically opposite zero points around the outer edges of the windows and co-ordinate with the compass degree scale, and a course index member interposed between the card and the mounting and having opposite indices to be set in selective relation to the respective indicia and show, on the compass card, the compass course and arcuate scales at the inner edges of the windows for showing the corrected course in "points."

3. A device of the character described comprising a top member with opposite windows, a pivot about which are scribed angular east and west scales at the outer edges of the windows, a course index member on the pivot and below the windows, and having radial indices to be set at respective scales at the windows, and a compass card turnable on the pivot to register with said scales.

4. A device of the character described comprising a top member with opposite windows and having a pivot about which are scribed angular east and west scales at the outer edges of the windows, a transparent course index member on the pivot and below the windows, and having diametrically opposite radial indices to be set at respective scales at the windows, and a compass card turnable on the pivot to register with said scales.

In testimony whereof, I have hereunto set my hand at San Francisco, California, this 26th day of July, 1919.

FRED M. KRAMER.

In presence of—
C. S. EVANS.